United States Patent [19]
Bauer

[11] Patent Number: 5,611,564
[45] Date of Patent: Mar. 18, 1997

[54] METHOD AND TREATMENT FOR FORMING AN AIR BAG DEPLOYMENT OPENING IN LEATHER COVERED TRIM

[75] Inventor: David J. Bauer, West Bloomfield, Mich.

[73] Assignee: Tip Engineering Group, Inc., Farmington Hills, Mich.

[21] Appl. No.: 109,122

[22] Filed: Aug. 18, 1993

[51] Int. Cl.⁶ .................................................. B60R 21/16
[52] U.S. Cl. ...................................... 280/728.3; 280/731
[58] Field of Search ............................ 280/728.1, 728.3, 280/750, 731, 732, 737; 264/39, 343

[56] References Cited

U.S. PATENT DOCUMENTS

| | | | |
|---|---|---|---|
| 5,024,160 | 6/1941 | Canterberry et al. | 280/741 |
| 5,082,310 | 1/1992 | Bauer | 280/732 |
| 5,096,220 | 3/1992 | Nakajima | 280/725 B |
| 5,179,132 | 1/1993 | Mizuno et al. | 280/728 B |
| 5,258,211 | 11/1993 | Momii et al. | 280/728 R |

*Primary Examiner*—Christopher P. Ellis
*Attorney, Agent, or Firm*—John R. Benefiel

[57] ABSTRACT

A pretreatment for a decorative leather covering layer overlying an air bag deployment opening in an automotive trim piece, the pretreatment results in an effective preweakening of the leather to be readily severed by the forced opening of an underlying hinged door panel. The pretreatment uses a hardening agent applied to the inside of the leather coveringlayer along a strip area extending in a pattern to match the unhinged sides of the door panel. The hardening agent saturates the leather in the strip area to 50–75% of the skin thickness. The leather covering layer has a notch groove formed therein extending along the middle of the strip area in the door pattern, the hardening rendering the leather notch sensitive so as to be effectively preweakened.

6 Claims, 1 Drawing Sheet

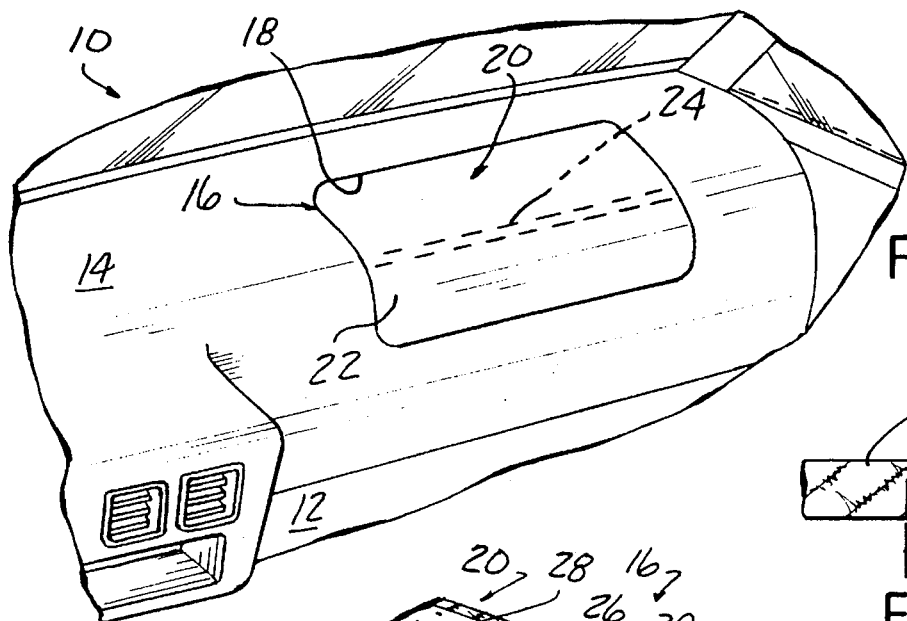
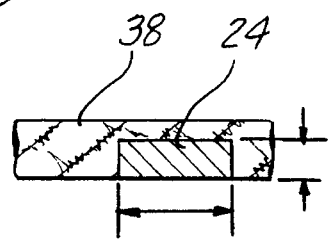
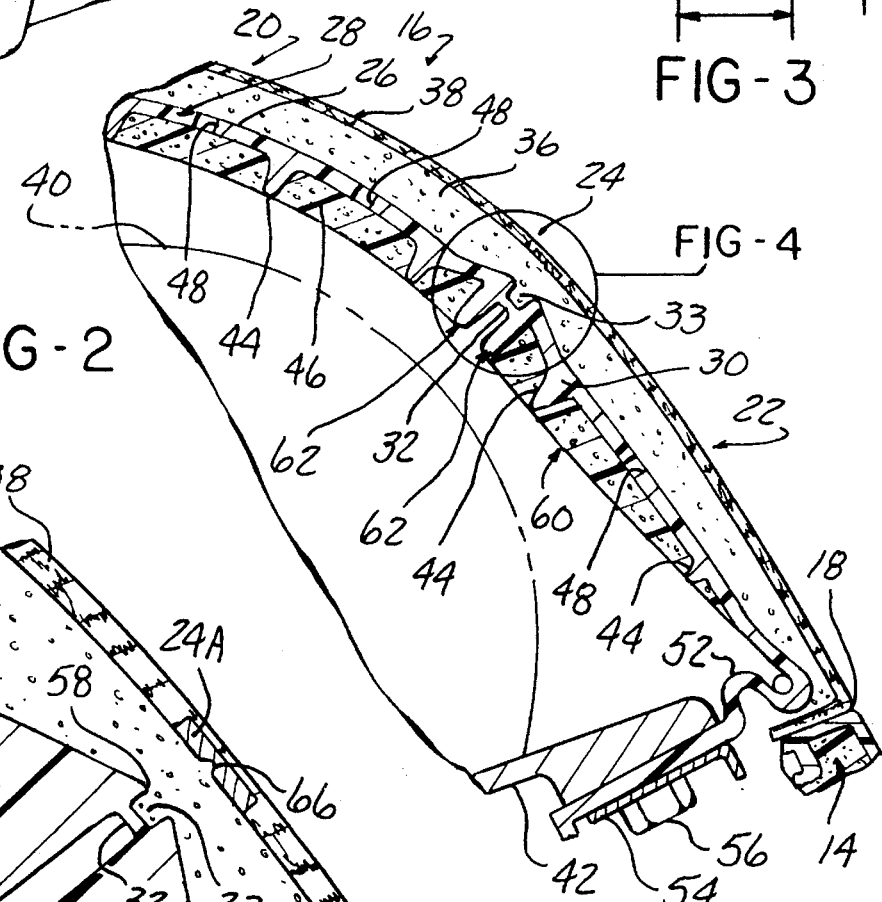
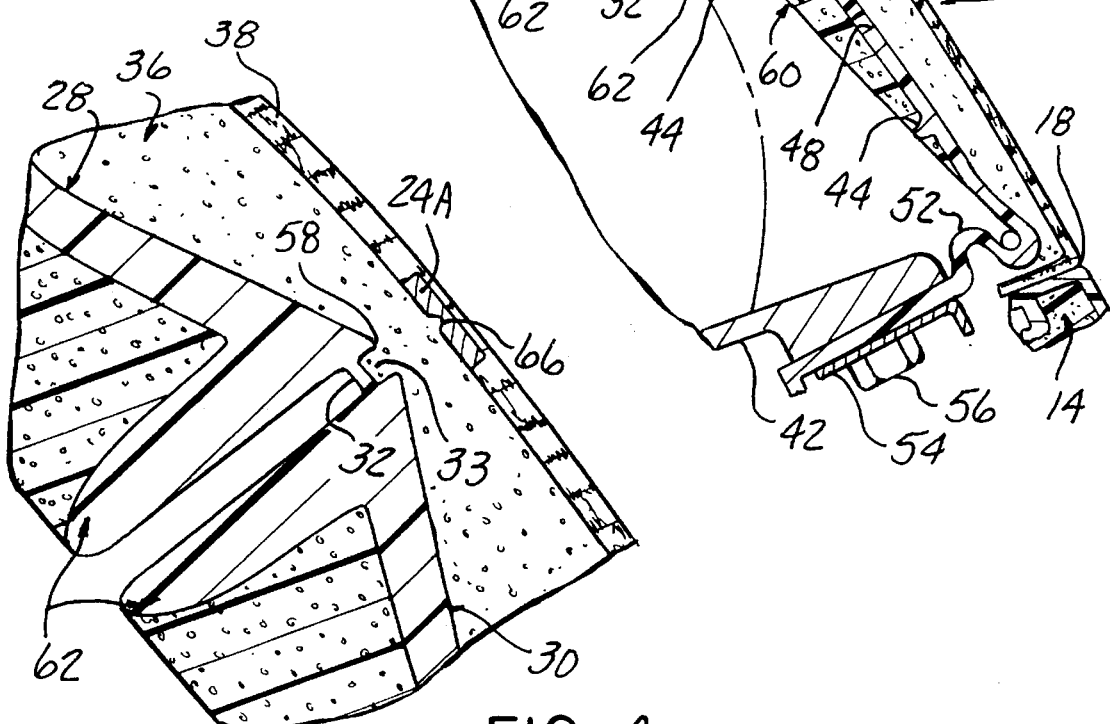

METHOD AND TREATMENT FOR FORMING AN AIR BAG DEPLOYMENT OPENING IN LEATHER COVERED TRIM

BACKGROUND OF THE INVENTION

This invention concerns arrangements for providing air bag deployment openings in automotive interior trim structure. Inflatable cushion devices (commonly referred to as "air bags") have been devised for automotive vehicles, in which one or more air bags are stowed in respective storage spaces located within the passenger compartment. Typically a driver's side air bag is stored in a compartment in the center of the steering wheel and a passenger's side air bag is stored in a compartment behind the instrument panel. Upon detection of a relatively severe collision, the air bag or bags are very rapidly inflated to be deployed in positions to cushion the driver and/or passengers from injury-causing contact with the interior structure of the auto.

The air bags must be neatly stowed out of sight and so as to be resistant to tampering, yet able to deploy into the passenger compartment in an instant. This requires a sturdy closure panel for the deployment opening, which preferably minimizes the visual impression of the presence of the closure, and yet reliably opens when the air bag is deployed under the wide range of ambient temperature conditions for which the auto is designed for use, and over the entire useful life of the car.

Such closures are usually opened by the force exerted by the inflating air bag, and the deployment of the air bag must not be appreciably slowed by resistance to the opening of the closure. The considerable force applied by the inflating air bag must not result in fragmentation or separation of the closure, lest debris be projected towards persons in the passenger compartment.

The closure is of necessity disposed facing the interior of the passenger compartment, and thus must be aesthetically compatible with the auto interior trim.

One approach has been to completely cover a closure door substrate with a seamless expanse of decorative vinyl skin covering extending completely over the adjacent instrument panel structure and/or steering wheel cover, which covering is ruptured along the perimeter of the opening when the closure is forced open.

The vinyl covering is relatively tough and resistant to tearing.

Preweakening of the covering has been utilized to facilitate severing by cutting of a notched groove into the inside of the cover in a pattern matching the sides of the closure door. U.S. Pat. No. 5,082,310 issued on Jan. 21, 1992, for an "Arrangement for Providing an Air Bag Deployment Opening" describes a method for cutting a groove on the inside of the vinyl skin covering.

Leather is also used as a decorative covering layer for automotive interiors. Leather is not sufficiently preweakened by scoring on the inside since it is tanned to a soft, flexible state and thus not by its nature notch sensitive.

Accordingly, the object of the present invention is to provide a method and treatment for preweakening a leather covering layer so as to be readily severed along a predetermined perimeter line as the door is forced open by the deploying air bag.

SUMMARY OF THE INVENTION

The invention involves the pretreatment of a leather covering layer extending over an air bag opening in an interior trim piece such as a driver's side steering wheel cover or an instrument panel. The pretreament comprises applying a low viscosity hardening agent applied to the inside of the leather covering layer along a localized strip area along which severing is to occur when the air bag is deployed. An example of a suitable hardening agent is lacquer, which can penetrate the leather when applied for a substantial depth into the leather, but which dries to form a hardened region in the leather along the strip area.

Another example is a mixture of ground acrylic fines and methylene chloride applied to the inner surface of the leather material.

The hardening agent saturates the leather material along the strip area, and upon drying, embrittles the leather material so that it becomes notch sensitive along the strip area.

The application of the hardening agent along the intended tear line pattern should be approximately 0.50 inches wide and penetrate the inner surface of the leather to a depth of between 10 and 75 percent of its thickness.

A notch groove is formed thereafter along the strip by some means, as by scoring with a scoring tool. The leather covering layer will then readily be severed under the dynamic localized loading imposed by the door substrate in being forced open by the inflating air bag. The cutting of the inner surface of the pretreated leather covering layer is to a depth of no more than 50 percent of its thickness as described in U.S. Pat. No. 5,082,310 in connection with a vinyl covering. The cutting of the notch groove may be also carried out by devices such as laser, sonic disruption, sonic welding and "poor" dielectric welding.

The pressure exerted by the deploying air bag easily severs or splits the pretreated and scored leather covering layer along the strip in a door matching pattern and allows the door (or doors) to fold back and form an air bag deployment opening.

DESCRIPTION OF THE DRAWINGS

FIG. 1 is a fragmentary perspective view of an auto interior with an instrument panel formed with an air bag deployment opening, and having an interfit closure, the instrument panel and closure covered with a preweakened leather covering layer according to the present invention.

FIG. 2 is an enlarged fragmentary transverse sectional view taken through the closure and adjacent instrument panel structure shown in FIG. 1.

FIG. 3 is a further enlargement of the transverse section of FIG. 2 which illustrates the pretreatment of the inside of the leather covering layer prior to scoring.

FIG. 4 is a further enlarged transverse sectional view through the closure door panels showing the details of the seam.

DETAILED DESCRIPTION

In the following detailed description, certain specific terminology will be employed for the sake of clarity and a particular embodiment described in accordance with the requirements of 35 USC 112, but it is to be understood that the same is not to be limiting and should not be so construed inasmuch as the invention is capable of taking many forms and variations within the scope of the appended claims.

The invention will be described as applied to the instrument panel air bag closure described in U.S. Pat. No. 5,082,310, but it should be understood that this is merely an example of one application and that the concept can be applied to any other air bag closure arrangement using preweakening of a leather covering layer. For example, it may be applied to steering wheel covers or instrument panels.

Referring to FIG. 1, a fragmentary view of the passenger compartment 12 of an automobile 10 is depicted, including an instrument panel 14 forming a part of the interior trim structure. Typical air bag systems include a separate air bag for the driver and passenger sides of the passenger compartment. The driver's side air bag is usually housed within a receptacle in the steering wheel and the passenger side air bag is contained within a receptacle located behind the instrument panel 14. As noted, the closure of the present invention may be applied to either the driver's or passenger's side, but will here be illustrated as on the passenger's side.

A closure 16 according to U.S. Pat. No. 5,082,310 is fit within an opening 18 in the instrument panel 14, the closure including an upper door panel 20 and a lower door panel 22 able to separate along a seam 24, each door hinging open along one side upwardly and downwardly respectively with the remaining sides separating from the closely adjacent instrument panel structure to create a deployment opening through which an inflating air bag can enter the passenger or driver compartment 12.

As will be described, the seam 24 defined by the sides of the door panels 20, 22 moving out of the opening 18 is designed to be invisible to a person within the passenger compartment 12.

Referring to FIG. 2 the closure 16 includes a one piece molded substrate member 26 having an upper door panel portion 28 and lower door panel portion 30 connected along the seam 24 by an integral thin frangible bridging portion 32 extending across a gap 33 between the upper door panel 20 and lower door panel 22.

The substrate member 26 is enclosed in a mass of foamed plastic having layers extending over and under the opposite sides of the substrate member 26. The foamed plastic 36 extends over the gap 33.

A decorative covering layer 38 comprised of flexible leather sheet is wrapped and bonded (by heat of injection of the foam 36) in position overlying the outside layer of foam plastic deposited over both upper door 20 and lower door 22, extending smoothly and uninterruptedly, over the seam 24. Since the leather covering layer 38 is supported by the foam 36 along the seam 24, the seam 24 will be invisible to an occupant of the auto.

The substrate member 26 is relatively rigid, the upper door panel portion 28 and lower door panel portion 30 defining structural members able to effectively transfer a shearing force to the frangible bridging portion 32. The opening pressure is exerted by the inflating air bag 40 stored behind the closure 16, folded within a canister 42.

The substrate member 26 may be of a low density olefin plastic such as polyethylene or TPO, and a grid network is formed on the inner face by an orthogonal array of molded ribs 44 forming rectangular open compartments 46.

A mechanical interlocking may be employed to secure the mass of foamed plastic 36 to the substrate, as disclosed in detail in U.S. Pat. No. 5,082,310. This mechanical interlock is created by injection of foamed plastic through openings 48 extending through the substrate member 26 into each compartment 46, so as to interconnect the layers of foam 36 on either side of the substrate member 26.

The substrate member 26 is also formed with hinging sections 50 and 52 integral with one side of each of the upper door panel 20 and lower door panel 22 respectively.

Each hinging section 50, 52 is attached to an opposite side of the air bag canister 42 or adjacent instrument panel structure as with a clamping plate 54 and rivets 56. The hinging sections 50, 52 are formed with a convoluted shape along the connected sides of the upper door 20 and lower door 22. This shape allows the doors 20, 22 to be pushed out and clear the adjacent instrument panel structure 14 prior to hinging opening of the doors 20, 22. This eliminates any interference therebetween due to the close fitting of the doors 20, 22 within the opening 18.

The substrate member 26 is curved in conformity with the shape of the instrument panel 14, but in the region adjacent the gap 33 is contoured with an edge 58 angled outwardly, while the mass of foam 36 and leather covering layer 38 continuously extend in that region. Thus, a reduced thickness of foam is located over the gap 33, and acute edges 58 assist severing of the reduced thickness of foam and the leather covering layer 38. The edge 58 also serves to stiffen the panel portions 28, 30, to enable effective application of the bursting pressure to the foam 36 and leather covering layer 38 along the seam 24.

The substrate member 26 is formed with raised edges 60 extending along the sides and ridges 62 along the door panel portions 28 and 30. Preferably, the ridge 60, and the ridge 62 are raised at the center to insure initial contact with the air bag 40 inflating from the canister 42 to exert maximum shearing pressure on the bridging portion 32, foam 36, and leather covering layer 38 above the gap 33.

The present invention is configured with a preweakening of the inner side of the decorative leather covering layer 38 along the seam 24. Thermoplastic materials such as vinyl have heretofore been predisposed to rupture or tear by forming a notch as by molding or by scoring the inside surface of the material.

Leather resists tearing along a predetermined notched line because, being tanned to a soft and flexible state, is not notch sensitive.

Therefore, according to the invention, a pretreatment is employed to cause the leather covering layer to be hardened and embrittled so as to be rendered notch sensitive in a localized strip area extending along the seam 24.

The pretreatment of a leather covering layer 38 over an invisible seam deployment door is shown in FIG. 3. The invention embodies the use of a low viscosity hardening material, an example being a conventional lacquer material applied to the inside surface of the material along a strip 24A extending in a pattern matching the seam 24 extending around the opening perimeter of the doors 20, 22 so as to saturate the leather along the strip area 24A. The lacquer when dried hardens and becomes relatively brittle, which causes the leather to change its character so as to become notch sensitive.

A mixture of ground acrylic fines and methylene chloride is another material which comprises a hardening agent.

The application of the hardening agent to the intended "hidden seam" pattern 24 should be approximately 0.50 inches wide; and saturate the inside surface of the leather between 1- and 75 percent, and preferably between 50 and 75 percent of its thickness. When thereafter scored or cut by some means to form a notch shaped groove extending in the door pattern, the leather covering in the localized area of the strip 24A becomes much more susceptible to breaking due to its greatly increased notch sensitivity and the presence of the groove. The leather covering layer 38 will then readily rupture or tear under the dynamic localized loading imposed by the doors 20, 22.

The groove may be formed by cutting the back surface of the material no more than 50 percent of its thickness as described in U.S. Pat. No. 5,082,310.

Commercial devices such as laser, sonic disruption, sonic welding, and "poor" dielectric welding may also be used to form the groove.

A sequenced severing of the components of the seam 24 is carried out by the pressure of the inflating air bag 40 acting on the inner surface of the upper and lower doors 20, 22.

The ridges 62 pivot together and thereafter the stress applied to the bridging portions 32 causes them to break, and thereafter the thickness of foam 36 and the preweakened leather covering layer 38 is severed to allow each of the upper door 20 and lower door 22 to hinge open. In a typical application, the cut 66 is approximately one half of the total thickness of the leather covering layer 38.

I claim:

1. In a closure for covering an air bag deployment opening formed in an interior trim piece of an automotive vehicle, said closure including:

a substrate member fit into said opening in said trim piece, said member defining a deployment door panel;

hinging means attaching one side of said door panel to said trim piece and other sides of said door panel closely adjacent but unattached to portions of said trim piece adjacent said opening;

a decorative covering skin comprised of a leather layer smoothly and uninterruptedly overlying said door panel and extending across said adjacent trim piece;

an uninterrupted foam plastic layer lying beneath said leather covering layer and atop said door panel, extending across said other sides and over said adjacent trim structure, completely filling a space therebetween;

characterized by a pretreatment for said leather covering layer, said leather covering layer partially saturated from the inside with a hardening agent in a strip area extending to overlie said other sides of said door panel and said closely adjacent trim piece.

2. The closure according to claim 1 wherein said leather covering layer is saturated with said hardening agent to a depth of 50–75% of its thickness.

3. The closure according to claim 2 wherein said strip is approximately 0.5 inches wide.

4. The closure according to claim 1 wherein said hardening agent comprises lacquer.

5. A method of pretreating a leather covering layer smoothly and uninterruptedly overlying an air bag deployment opening in an automotive interior trim piece comprising:

saturating said leather covering layer from the inside to at least a portion of its thickness with a hardening agent in an area extending along a strip extending in a pattern corresponding to the perimeter of said deployment opening; and, thereafter forming a notch groove extending along the inside of said leather covering layer in said strip area in said corresponding pattern.

6. The method according to claim 5 wherein said leather covering layer is saturated with said hardening agent to a depth of 10–75% of its thickness.

* * * * *